Figure 1:
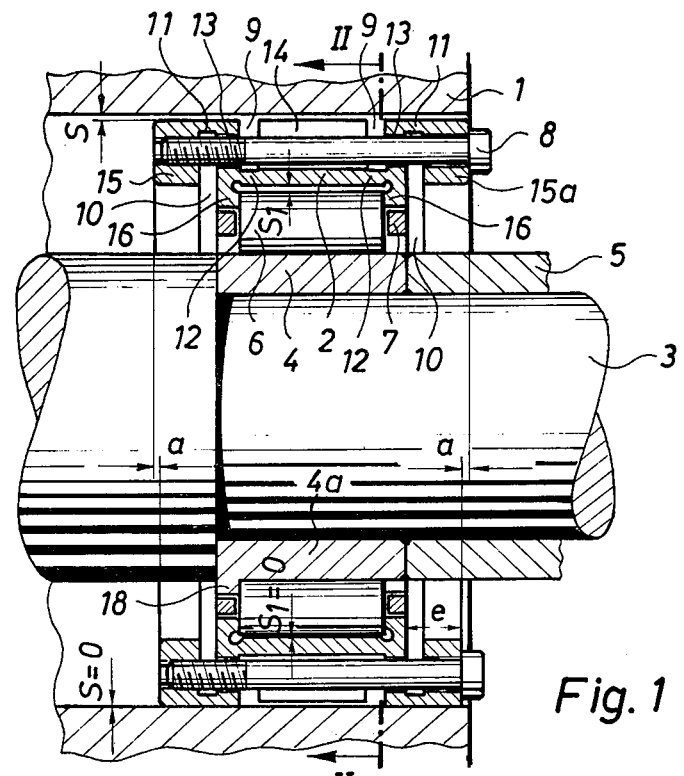

United States Patent
Spieth

[11] 3,907,387
[45] Sept. 23, 1975

[54] ANTI-FRICTION BEARING

[76] Inventor: Rudolf Spieth, (2) Kennenburger Str. 42, 73 Esslingen (Neckar), Kennenburg, Germany

[22] Filed: Feb. 22, 1974

[21] Appl. No.: 445,307

[30] Foreign Application Priority Data
Mar. 2, 1973  Germany............................ 2310511

[52] U.S. Cl. .............................................. 308/236
[51] Int. Cl.² ........................................ F16C 33/30
[58] Field of Search............ 308/207 A, 207 R, 216, 308/189, 236

[56] References Cited
UNITED STATES PATENTS

| | | | |
|---|---|---|---|
| 513,075 | 1/1894 | Botsford | 308/207 A |
| 610,436 | 9/1898 | Dickinson | 308/216 |
| 2,018,221 | 10/1935 | Mueller | 308/236 |
| 2,244,197 | 6/1941 | Hessler | 308/216 |
| 2,259,325 | 10/1941 | Robinson | 308/216 |
| 3,469,897 | 9/1969 | Rike | 308/236 |
| 3,470,754 | 10/1969 | Ferrara | 308/236 |
| 3,543,367 | 1/1968 | Arnot | 308/216 |

Primary Examiner—Lloyd L. King
Attorney, Agent, or Firm—Roylance, Abrams, Berdo & Kaul

[57] ABSTRACT

A bearing having a conventional inner race and a clampable outer race in which there is a track engaging a plurality of rolling bodies and axial end portions defining an outer annular recess holding a reinforcing ring. Axially spaced inwardly opening annular recesses are also defined by the ends of the race. Thinned portions of the race wall between the recesses provide joints or flexible hinges which permit axial and radial deformation of the race without deformation of the track portion. A plurality of clamping screws extend through openings in the race and are threaded therein to permit uniform clamping pressure to be applied circularly about the race, permitting the deformation. Openings in the walls and reinforcing ring provide passage for the clamping screws. A flange for axial retention of the roller members is provided. In other disclosed embodiments, roller and Timken bearing structures can be similarly designed.

7 Claims, 2 Drawing Figures

ANTI-FRICTION BEARING

This invention relates to an anti-friction bearing of the roller bearing type and, more specifically, a roller bearing construction in which distortion of the raceways is prevented under axial clamping pressure.

It is well known to provide a roller bearing with cylindrical roller members having an inner race and an outer race wherein the outer raceway has radially inwardly extending notches or recesses into which the clamping screws or bolts are placed. When the clamping screws are tightened, the inner and outer races are tightened against their respective interior and exterior members so that the bearing can perform its function of providing a low friction coupling between the members. However, in prior art structures, as illustrated in German Patent 965,671, the track of the raceways, particularly the outer raceway, develops an arched configuration in cross section so that the surface which engages the rolling bodies is arched and the contact is reduced in an undesirable fashion.

Accordingly, an object of the present invention is to provide an anti-friction bearing in which the track in which the rolling members rides is substantially undistorted under clamping conditions.

Briefly described, the foregoing and other objects are attained by providing a reinforcing ring to support the radial shape of the outer raceway to resist deformation of the track, particularly to resist a tendency to arch, as viewed in the cross-section of the raceway, during clamping of the clamping member, so that the roller member engaging surface of the track remains essentially undistorted. The outer raceway is then designed with a radially inwardly extending annular recess in which the reinforcing ring resides and two annular recesses within the outer portions of the outer raceway and axially disposed on opposite sides of the roller bodies, the three recesses thus forming rings with flexible portions to permit radial distortion of portions of the outer race other than the track itself, when axially clamped, but to prevent bending of that portion which forms the track. No recess or notch is provided in the raceway itself, there being openings in the axially spaced portions thereof to receive the clamping screws.

Several clamping screws are provided, the screws being equally spaced in a radial direction and also equally spaced circularly from each other, these screws penetrating the raceway in the areas of the recesses previously described. The raceway can be fixed in a bore of fixed cross-section in an axial direction in any arbitrary position with the help of the clamping screws. Since the clamping force is applied to both sides of the raceway, because of the manner of engagement of the screws, no friction disadvantageous to the clamping down of the raceway can occur between the raceway and the body receiving it. The raceway merely adapts itself to the bore accommodating it and is not exposed to uneven lateral pressures of a clamping nut which can be screwed into the bore or into a laterally mounted clamping disc.

In a bearing of the type in which the second or inner track for the roll bodies is limited by a radially outwardly extending shoulder, then the clearance in the anti-friction bearing can be adjusted in an axial direction in a simple manner during insertion of the anti-friction bearing in its bore. Still further, a flange, projecting toward the sides of the roll bodies and limiting them laterally is shown in connection with the raceway between an outside recess and an inside recess adjacent to it. As a result, there is a good longitudinal guidance of cylindrically shaped roll bodies.

Figure 2:
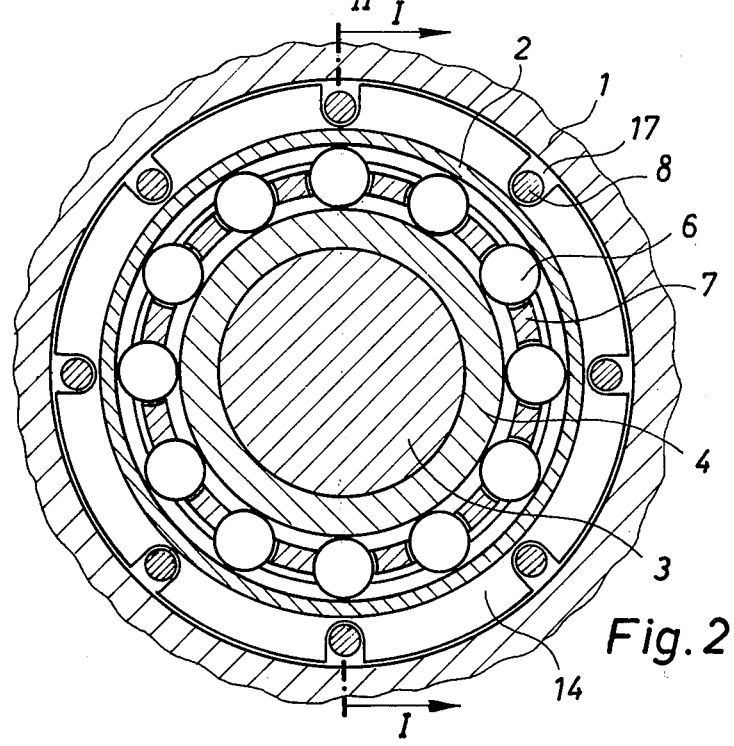

Further advantages and objects will become apparent in connection with the detailed description in the specification, in conjunction with the accompanying drawings, wherein:

FIG. 1 is a section along lines I—I in FIG. 2, showing a side elevational of a bearing according to the invention, the upper portion thereof being in unclamped condition and the lower portion being in a clamped condition; and FIG. 2 is a section along lines II—II of FIG. 1, of a front elevation of a bearing according to the invention.

Referring now to the drawings, an outside ring 2 constitutes the outer track of the outer raceway of an anti-friction bearing which is seated in a bore in a bearing housing 1 which is one member of the two which are to be relatively rotatable. The inside ring 4 of the bearing, which constitutes the inner track surface, is clamped on to a spindle 3 between a spacer 5 and a shoulder of the spindle, the spindle being the second member to be relatively rotatable. Cylindrical roller bodies 6 are disposed between the inside ring 4 and the outside ring 2, the roll bodies being guided and spaced by a cage structure 7 of conventional type.

Outer ring 2 has an outer recess 9 which has an axial dimension approximately equal to the axial length of roller bodies 6, recess 9 constituting an annular cavity which is separated into two portions by a reinforcing ring 14. The two recess portions thus formed are axially spaced from each other and are radially outwardly directed from the ends of the roller bodies.

The outer raceway is also formed to define two annular cavities 10 which are relatively flat in the axial direction and which are displaced radial from the roll bodies and from cavity portions 9. It will be observed that cavity 9 opens outwardly away from the roll bodies whereas cavities 10 open inwardly with respect to the race body toward the roller bodies. First and second joint portions 11 are formed in the outer race body at the radial outward limits of cavities 10, the joints thus formed being relatively thin portions of the outer race structure. In somewhat similar fashion, the portion of the outer race at the inner corners of cavities 9 is thinned to constitute flexible joint portions 12, the thickness of the joint wall at joints 11 being thinner than that at joint 12.

Between the inner recesses 10 and the outer recesses 9 is a supporting ring 13 which constitutes a relatively strong annular portion of the outer race defining and limiting the two recesses. In the same plane as ring 13 and extending radially inwardly therefrom beyond joint 12 is a flange 16 which serves to limit the lateral motion and to guide the ends of roller bodies 16. The outer axial limits of recesses 10 are defined by collar or locking rings 15 and 15a, collar 15 having threaded holes to receive the threaded ends of clamping screws 8. The clamping screws pass through openings in collar 15a, the openings in the two collars being disposed at equal radial distances and the openings also being equally spaced circularly. The clamping screws pass through openings in collar 15a and rings 13 and threadedly engage collar 15. The openings through rings 13 are sufficiently large to permit clearance between the rings and the clamping screws to accommodate relative motion during the clamping process. As shown in FIG. 2, it is preferred that eight clamping screws be provided.

Reinforcing ring 14 occupies substantially the entire width of annular recess 9, leaving small recesses at the ends thereof, and the axial dimension of the ring approaches that of the roll bodies 6. Radially inwardly extending recesses 17 are provided in the reinforcing ring to permit the passage of the clamping screws. Again, the recesses are sufficiently to permit clearance between the recesses and the screws.

The anti-friction bearing thus described is first attached by placing the inside ring 4 on the spindle 3, the spindle and associated bearing structure, with the outside ring and roller bodies, then being placed into the bearing housing so that the roll bodies 6 run on the outer surface of the inside ring 4. During installation, there exists an installation clearance S and a bearing clearance S1 which are shown in exaggerated form in FIG. 1. Clamping screws 8 are then tightened in a uniform fashion, pulling collars 15 and 15a toward each other and causing the entire structure to expand in a radial direction, first eliminating installation clearance S and subsequently adjusting the bearing clearance S1 to a desired dimension, which dimension can be zero or even negative. It will be observed that, in FIG. 1, the upper half is shown with the clearances but that in the lower half the clamping has been accomplished and both clearances are zero. During the tightening process, the outer track adjacent roll bodies 6 is not arched, but instead, the track remains in the shape of a right circular cylinder. That portion of the outside ring 2 which is weakened by the diminished thickness permits relative distortion between the track portion and the rings and collars but the track itself is subjected to practically no deformation.

In the case in which the inside ring 4a is provided with an annular flange or stop shoulder 18 than the axial clearance of the anti-friction bearing can also be adjusted manually. The dimension $e$ can be measured in order to control the bearing clearance or play and of the uniform tightening of clamping screws 8 across the periphery. The cylindrical roller bearing as shown in the lower part of FIG. 1 is thus constructed so that the outer raceway 2 can be fixed into a housing bore without having to provide flat stop surfaces and, moreover, the bearing play can be adjusted both in radial and axial directions. As the result of the lateral flange 16 there is good longitudinal guidance of the anti-friction bodies, shown as cylindrical rolls, since during the tightening there is substantially no change in the distance of the flanges.

The use of adjustable outside rings 2, in accordance with the embodiment disclosed by way of example, permits the fitting of the outside ring to the cylindrical body of the revolving spindle so that no bending of the spindle occurs. The use of clamping screws 8 permits an even introduction of the tightening on outside ring 2 from both sides, whereby the clamping screws 8 need not be tightened only from one side. The outside ring can expand slightly during increase of operating temperatures when clamping screws 8 are used.

In the disclosed apparatus, it is the outside ring 2 which has been shown in the specially developed form and inside ring 4 is of a conventional nature. However, it is also possible to reverse these bodies so that the outside ring is of conventional form and the inner ring is formed in the special manner shown. It should also be recognized that, regardless whether the special ring is on the inside or the outside, flange 16 can be omitted on the ring to be clamped down. It is also possible when that flange is provided to eliminate the other raceway entirely.

It is also possible, although not as desirable, to eliminate the clamping screws and to tighten down the ring to be clamped, whether inside or out, between a shoulder and a tightening nut or clamping lid.

It will also be recognized that when an adjustment of the bearing play dimension S1 is possible in some manner other than that shown, slits 17 in the reinforcing ring 14 can be omitted. This would be the case, for example, if the bearing is of the taper roller type (Timken bearing) wherein the axial play can be adjusted by axial engagement of the clamping ring having a conicle track. The same is true for a detachable magneto-type ball bearing (detachable ball journal) in which case the track in the clampable raceway and the counter track in the cross-section are caused to be arched each time. It is also possible to attach a covering disc or a plate, laterally covering up the anti-friction bearing with the help of clamping screws.

While certain advantageous embodiments have been chosen to illustrate the invention, it will be understood by those skilled in the art that various changes and modifications can be made therein without departing from the scope of the invention as defined in the appended claims.

What I claim is:

1. An antifriction bearing having a raceway and a plurality of rolling bodies, the raceway comprising
    a central portion forming a track having one surface in contact with the bodies;
    means including said central portion for defining a first annular recess opening away from the bodies;
    a reinforcing ring in said recess;
    means connected with said central portion for defining second and third annular recesses opening in the opposite direction from said first recess,
    said second and third recesses being axially spaced from and on opposite sides of said first recess,
    said second and third recesses being axially spaced apart from each other by a distance at least as great as the axial dimension of the roll bodies;
    means for axially clamping said raceway at a location radially adjacent said first, second and third recesses; and
    reinforcing ring means surrounding said central portion for inhibiting distortion of said track when said raceway is clamped by said means for clamping.

2. An antifriction bearing according to claim 1 wherein said means for clamping comprises a plurality of clamping screws passing through said raceway in the area of said second and third recesses, said screws being spaced at equal radial and peripheral distances.

3. A bearing according to claim 1 and further comprising a second track having a radially extending flange.

4. A bearing according to claim 1 wherein said raceway is provided with a radial flange protruding partially across said rolling bodies, said flange being between said first recess and the closest one of said second and third recesses.

5. A bearing according to claim 1 wherein said reinforcing ring means includes means defining a plurality of recesses extending radially inwardly therein to approximately the depth of said first recess, said recesses being circularly spaced apart by equal distances.

6. A bearing according to claim 5 wherein said means for clamping comprises a plurality of clamping screws, and wherein said screws pass through said recesses.

7. A bearing according to claim 1 wherein the portions of the raceway between the means defining said first recess and the means defining said second and third recesses comprise first and second thinned portions and wherein the radial limits of said second and third recesses comprise third and fourth thinned portions, said third and fourth thinned portions being thinner than said first and second thinned portions.

* * * * *